(12) United States Patent
Pawelec

(10) Patent No.: US 11,987,185 B2
(45) Date of Patent: May 21, 2024

(54) WINDSCREEN

(71) Applicant: Pilkington Group Limited, Nr. Ormskirk (GB)

(72) Inventor: Lukasz Pawelec, Sandomierz (PL)

(73) Assignee: PILKINGTON GROUP LIMITED, Lancashire (GB)

( * ) Notice: Subject to any disclaimer, the term of this patent is extended or adjusted under 35 U.S.C. 154(b) by 144 days.

(21) Appl. No.: 17/637,333

(22) PCT Filed: Aug. 21, 2020

(86) PCT No.: PCT/GB2020/052012
§ 371 (c)(1),
(2) Date: Feb. 22, 2022

(87) PCT Pub. No.: WO2021/038201
PCT Pub. Date: Mar. 4, 2021

(65) Prior Publication Data
US 2022/0363203 A1 Nov. 17, 2022

(30) Foreign Application Priority Data
Aug. 23, 2019 (GB) .................................. 1912157

(51) Int. Cl.
*H04N 23/51* (2023.01)
*B60R 11/04* (2006.01)
(Continued)

(52) U.S. Cl.
CPC ............ *B60R 11/04* (2013.01); *G03B 17/561* (2013.01); *H04N 23/51* (2023.01); *B60R 2011/0026* (2013.01)

(58) Field of Classification Search
CPC .......... B60R 11/04; B60R 11/02; H04N 23/51
(Continued)

(56) References Cited

U.S. PATENT DOCUMENTS 9,487,156 B2 * 11/2016 Frenzel ................... B60R 11/02
9,862,332 B2 * 1/2018 Okuda ..................... B60R 11/04
(Continued)

FOREIGN PATENT DOCUMENTS

DE 102013005801 A1 10/2014
EP 2965949 A1 1/2016
(Continued)

OTHER PUBLICATIONS

International Search Report (PCT/ISA/210) and Written Opinion (PCT/ISA/237) dated Oct. 5, 2020, by the European Patent Office as the International Searching Authority for International Application No. PCT/GB2020/052012. (6 pages).
(Continued)

*Primary Examiner* — Todd M Epps
(74) *Attorney, Agent, or Firm* — BUCHANAN INGERSOLL & ROONEY PC

(57) ABSTRACT

A vehicle windscreen has a bracket for a sensor including a camera, the bracket being attached to the windscreen and comprising a baseplate and at least three retaining elements mounted on the baseplate. The sensor is accommodated within a sensor housing that comprises at least three mounting stubs projecting from the sensor housing. Each retaining element comprises a fixed support portion and a resilient limb fixed at one end and free at the other end, with a guideway extending between each resilient limb and its respective fixed support portion, the guideway being provided to guide the respective mounting stub when inserted in the bracket. Each resilient limb and fixed support portion defines a retaining portion, whereby the mounting stub when inserted in the bracket and having passed along the guideway is stopped and retained in the retaining portion by the biasing action of the resilient limb.

16 Claims, 9 Drawing Sheets

(51) Int. Cl.
  *G03B 17/56* (2021.01)
  *B60R 11/00* (2006.01)
(58) Field of Classification Search
  USPC .......................................................... 248/208
  See application file for complete search history.

(56) References Cited

U.S. PATENT DOCUMENTS

| | | | |
|---|---|---|---|
| 10,556,553 B2 * | 2/2020 | Kasarla | .................. H04N 23/57 |
| 10,676,040 B2 * | 6/2020 | Naoi | ....................... B60R 11/04 |
| 11,292,396 B2 * | 4/2022 | Hwang | ................. B60R 19/483 |
| 2010/0065707 A1 | 3/2010 | Hansel | |
| 2011/0233248 A1 | 9/2011 | Flemming | |
| 2016/0009230 A1 | 1/2016 | Miyado et al. | |
| 2016/0257261 A1 | 9/2016 | Kageyama | |
| 2017/0217382 A1 | 8/2017 | Gunes | |
| 2017/0240120 A1 | 8/2017 | Krug et al. | |
| 2019/0193649 A1 | 6/2019 | Kataishi et al. | |

FOREIGN PATENT DOCUMENTS

| | | | | |
|---|---|---|---|---|
| EP | 2819885 B1 | 5/2016 | | |
| JP | 2013186278 A | 9/2013 | | |
| WO | 2013087145 A1 | 6/2013 | | |
| WO | 2018055905 A1 | 3/2018 | | |
| WO | WO-2018055905 A1 * | 3/2018 | ............. | B60R 11/04 |

OTHER PUBLICATIONS

GB Search Report issued in corresponding Danish Patent Application No. GB1912157.3 dated Feb. 4, 2020. (3 pages).

* cited by examiner

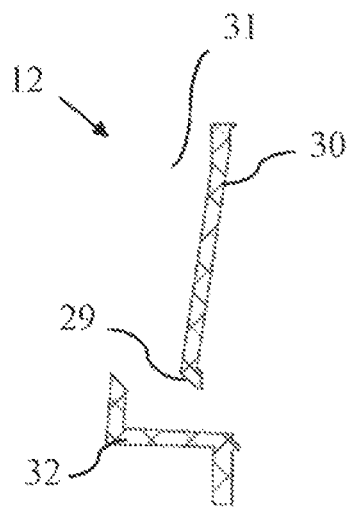
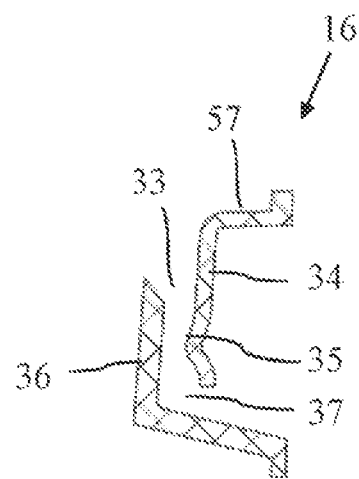
FIG. 4(a)
FIG. 4(b)
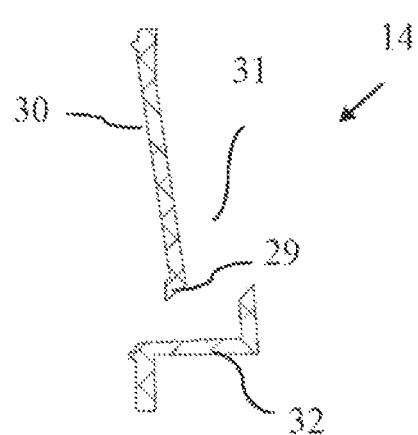
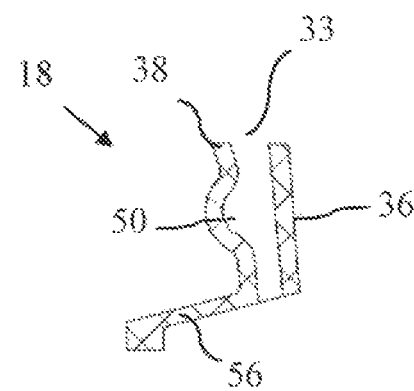
FIG. 4(c)
FIG. 4(d)

WINDSCREEN

The present invention relates to a windscreen, such as a windscreen for a vehicle, and in particular, to a windscreen having a bracket attached to it. The bracket may be for a sensor, including a camera. The invention also relates to the bracket itself, and in particular, to an arrangement for retaining the sensor or camera within the bracket.

In recent years, the fitting of sensors to vehicles has become more widespread. Moisture sensors are fitted to control the functioning of windscreen wipers, and light sensors are fitted to control the switching on and off of lighting systems (e.g. the vehicle's headlights and tail-lights) according to ambient light levels. An increasing number of vehicles are now fitted with Advanced Driver Assistance Systems (ADAS), for example autonomous emergency braking, lane departure warning systems, adaptive cruise control and high beam assist, amongst others. Many of these systems employ one or more imaging sensors in the form of cameras mounted on the vehicle windscreen to provide images of the area ahead of the vehicle; these images are processed to yield data on which ADAS depend.

A known method of mounting cameras and sensors on the windscreen is by means of a suitable bracket, which is bonded to the windscreen. Brackets may be manufactured in metal or plastic and may accommodate several sensors and cameras. The bracket may be integrated with the mounting for an interior rear-view mirror. The correct functioning of ADAS is important for the safety of a vehicle and its occupants, and it is therefore also important that the camera or cameras on which ADAS depend is mounted accurately and securely. The bracket has an important role to play in achieving this.

Unfortunately, the windscreen of a vehicle may be damaged in service and need to be replaced. To reduce the costs associated with replacing a windscreen, it is normal practice to redeploy the cameras and sensors by transferring them to the new windscreen and recalibrating ADAS. Therefore, cameras and sensors need to be retained within the bracket in a manner which allows them to be easily removed and replaced. It is also extremely important that cameras are positioned accurately every time that they are replaced in a bracket after removal, i.e. that the camera positioning is reproducible.

A variety of different retention systems has been proposed for retaining cameras and sensors within a bracket.

WO-A-2018/055905 discloses an imaging device with an imaging unit that is stably supported by a bracket and adverse effects on the imaging unit caused by differences in the amount of thermal expansion between the bracket and the imaging unit are reduced.

U.S. Pat. No. 9,487,156 (and its European equivalent, EP-A-2 819 885) discloses a holding frame for receiving and holding a sensor device, which may be a camera. The bracket has guideways to receive and guide holding elements of the sensor device, and devices such as guide ramps to produce a force on the sensor device in a direction along the guideways. The bracket may also include additional devices in the form of spring elements for mechanically fixing the sensor device in the bracket.

U.S. Pat. No. 9,862,332 discloses an in-vehicle camera having a camera body with projections and bosses by means of which the camera body is hooked on a hook portion of a bracket attached to a windscreen. A leaf spring also presses the camera body against the bracket.

DE 10 2013 005 801 discloses a plastic bracket for fastening to a vehicle window and having a support arrangement designed to retain at least one camera housing without the use of metal springs. The support arrangement includes at least one, preferably three, plastic clip elements designed to cooperate with rod-shaped components arranged on the camera housing. However, the camera housing is not retained sufficiently securely by the clips alone, and so in a further embodiment, the support arrangement is augmented by securing elements. Unfortunately, these securing elements require a step to be machined into the ends of the rod-shaped components, and this adds to the cost of the camera housing.

EP-A-2 965 949 discloses an attachment structure for an in-vehicle camera requiring two brackets that cooperate to retain the camera in place. The first bracket is fixed to an inner surface of a windshield, the second bracket holds an in-vehicle camera when the second bracket is attached to the first bracket at an attachment position. The first bracket includes a support portion and a first one-way engagement portion. The brackets comprise respective engagement portions which, when engaged together, inhibit the second bracket from moving with respect to the first bracket.

US 2017/240120 discloses a carrier device, i.e. a bracket, for attachment to a vehicle window. The carrier device has a base plate which is secured to the window, on which base plate a carrier arrangement is formed to hold a housing of at least one camera. The carrier arrangement includes at least one holding element having at least one spring element which is designed to apply pressure to a rod-shaped component which is arranged on the camera housing.

The use of metal springs in a plastic bracket is problematic. The springs must be fabricated separately from the bracket, but a separate assembly step is then required, in which the springs are inserted into the bracket. Retention of the springs themselves within the bracket may be a problem, necessitating the taking of additional measures to prevent the springs becoming dislodged. The need for a separate metal spring, and for two (or more) components to cooperate in order to retain the sensor/camera or further assembly steps (especially when components of the sensor/camera housing require modification) significantly adds to the cost and complexity of the mounting system.

It would therefore be desirable to provide a bracket for a sensor (including a camera), suitable for attaching to a windscreen, which is able to meet the required standards of accuracy, security, and reproducibility of positioning and retention of the camera in a cost-effective manner, yet without employing metal springs, or other measures which add to the cost and complexity of the arrangement. Reducing cost and complexity would be particularly advantageous when brackets are to be fixed to replacement windscreens.

It is an aim of the present invention to address the problems of the prior art and provide such a bracket.

The present invention accordingly provides, in a first aspect, a windscreen for a vehicle, the windscreen comprising:

a bracket for a sensor including a camera, the bracket being attached to the windscreen and comprising a baseplate and at least three retaining elements mounted on the baseplate, the sensor being accommodated within a sensor housing which may be inserted in the bracket, the sensor housing comprising at least three mounting stubs projecting from the sensor housing by means of which the sensor housing may be retained in the bracket in a removable manner by retaining each of the mounting stubs in a corresponding retaining element, wherein:

each retaining element is elongate, and comprises a fixed support portion at one end and is open at the other end to receive one of the mounting stubs, each retaining element comprises a resilient limb which extends in the direction of elongation of the retaining element, the resilient limb being fixed at one end and free at the other end, a guideway is provided in the vicinity of the open end of each retaining element, the guideway being partially defined by the resilient limb and its respective fixed support portion, and the guideway guides the respective mounting stub into the corresponding retaining element when the sensor housing is inserted into the bracket, each resilient limb and fixed support portion is so arranged that together they define a retaining portion, whereby when the mounting stub has been inserted in the bracket and has passed along the guideway it is stopped and retained in the retaining portion by the biasing action of the resilient limb.

A windscreen provided with a bracket as described above is advantageous because such a bracket provides a relatively simple and strong means for holding the sensor including a camera. This design of bracket eliminates the need for separate components such as a secondary bracket, cradle or carrier which would have to be provided separately and attached correctly to the bracket. It also eliminates the need for separate metal springs, which would have to be installed in the bracket, thereby also necessitating a separate operation. A bracket according to the invention therefore reduces complexity and cost.

Preferably, the entrance to at least one guideway may be flared to accommodate the mounting stub. This renders the guideway more tolerant and accommodating of slight errors in the line or angle of approach of the sensor housing as it is inserted in the bracket, thereby facilitating installation.

Preferably, at least one retaining portion comprises a retaining recess to retain the mounting stub. Provision of a retaining recess for the mounting stub enables more positive and secure retention of the mounting stub. For instance, the at least one resilient limb may be shaped to at least partially form the retaining recess. Moreover, the retaining recess may be at least partially concave to better receive and retain the mounting stub. The mounting stub may for example be cylindrical or polygonal in cross-section, and the shape of the retaining recess may correspond to the shape of the mounting stub, again, for more secure retention thereof.

Other measures may be taken to further improve the retention of the mounting stub in the corresponding retaining element. For instance, the at least one resilient limb may comprise a retaining tab projecting into the guideway to further retain the mounting stub when in the retaining portion. Additionally, or alternatively, at least one resilient limb may comprise a retaining lip projecting into and angled into the guideway to further retain the mounting stub when in the retaining portion. In this case preferably the retaining tab or retaining lip on the resilient limb provides a snap action retaining portion for the mounting stub so that it is easier to determine when the mounting stub is retained in the resilient element.

Preferably, there are four mounting stubs projecting from the sensor housing and four corresponding retaining elements. While three mounting stubs are sufficient for secure retention, since many sensors or cameras have generally square or rectangular housings, it is often convenient to provide the sensor housing with four mounting stubs. These may be arranged with two mounting stubs per side of the housing, but other configurations are possible. When two mounting stubs per side of the sensor housing are provided, the corresponding retaining elements may be arranged on the baseplate of the bracket with their directions of elongation parallel and substantially aligned with each other. Moreover, the directions of elongation may be in line with each other. This arrangement facilitates easy and reliable insertion of the sensor housing in the bracket, because, having lined up the lower mounting stubs with the respective guideways of their respective retaining elements, the upper mounting stubs naturally follow on as the sensor housing advances into the bracket, without need for further adjustment of the trajectory of the sensor housing.

The bracket may further comprise a biasing device to press the sensor housing against one or more of the retaining elements. The biasing device may be located on the baseplate, inboard from the periphery of the bracket. It may take the form of a strip or tab of plastic protruding from the baseplate, and may be curved. The biasing device may resemble a leaf spring, but formed of plastic.

The at least one resilient limb may have a free end and a fixed end, and the fixed end may be supported by a support portion fixed to the bracket and proximal to the entrance to its respective guideway.

Additionally, or alternatively, at least one resilient limb may have a free end and a fixed end, and the fixed end may be supported by a support portion fixed to the bracket and distal to the entrance to its respective guideway. In other words, the design of the resilient limb is flexible, and the resilient limb may be oriented either way round, i.e. either with its free end pointing towards the open end of the retaining element, or away from it.

Preferably, the width of the mounting stub is greater than the corresponding dimension of its respective retaining portion. This means that the resilient limb remains slightly deflected from its unstressed or rest position, even when the mounting stub is in its final position in the retaining portion, and consequently the biasing action of the resilient limb is increased. Owing to the deflection of the resilient limb from its rest position, a restoring force is generated, which is exerted on the mounting stub and acts as a retaining force.

Preferably, the bracket is arranged so that the sensor housing is inserted into the bracket in a direction substantially parallel to the baseplate.

It is preferred that the bracket is made wholly of plastic. Furthermore, it is advantageous if the bracket is sufficient to retain the sensor without a second bracket or separate parts (e.g. separate springs that need to be fixed in or to the bracket) attached to the bracket. One advantage of the bracket according to the invention is that it does not require separate springs, be they of metal or other material. This advantage may be more fully exploited if all non-plastic components are eliminated, thereby simplifying manufacture. It is further preferred if the bracket can be moulded in one-piece form. It is yet more preferred if the bracket can be moulded in a single moulding operation. The bracket according to the invention is capable of retaining the sensor without the need for a second bracket, carrier, cradle or other separate subsidiary parts.

In a second aspect, there is provided a bracket adapted to receive a sensor including a camera, and the bracket is in accordance with a bracket as set forth in the first aspect, and as described above.

In a third aspect, the invention further provides a windscreen for a vehicle, the windscreen comprising, a bracket for a sensor including a camera, the bracket being attached to the windscreen and comprising a baseplate and at least three retaining elements mounted on the baseplate, the sensor being accommodated within a sensor housing which may be inserted in the bracket, the sensor housing comprising at least three mounting stubs projecting from the sensor housing by means of which the sensor housing may be retained in the bracket in a removable manner by retaining each of the mounting stubs in a corresponding retaining element, wherein each retaining element comprises a fixed support portion and a resilient limb fixed at one end and free at the other end, with a guideway extending between each resilient limb and its respective fixed support portion, the guideway being for guiding the respective mounting stub when inserted in the bracket, wherein each resilient limb and fixed support portion are so arranged that together they define a retaining portion, whereby the mounting stub when inserted in the bracket and passing along the guideway is stopped and retained in the retaining portion by the biasing action of the retaining limb.

The present invention will now be described by way of example only, and with reference to, the accompanying drawings, in which.

Figure 2:
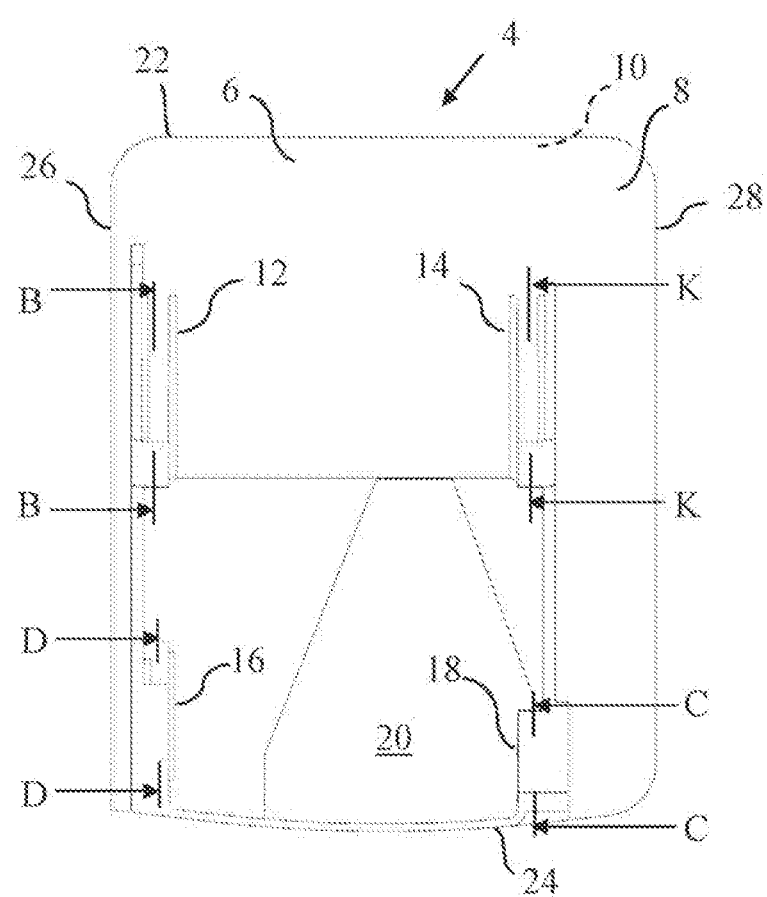
FIG. 2 is a plan view of the bracket of FIG. 1, greatly enlarged, and again viewed from the interior of the vehicle, showing the face of the bracket to which the sensor is mounted.
Figure 5A:
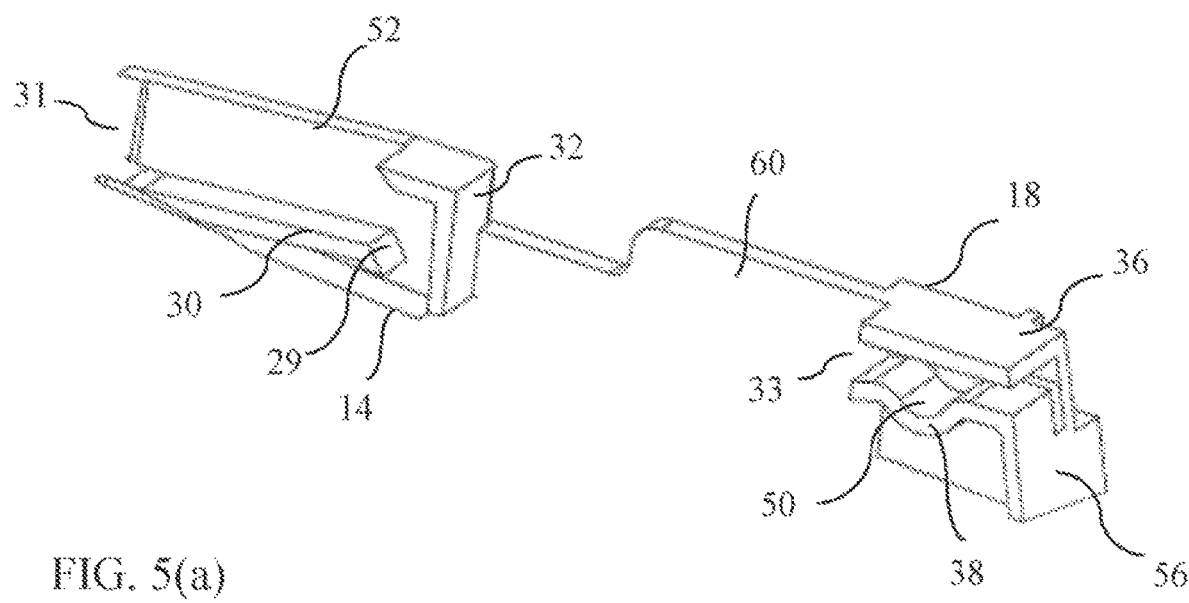
Figure 5B:
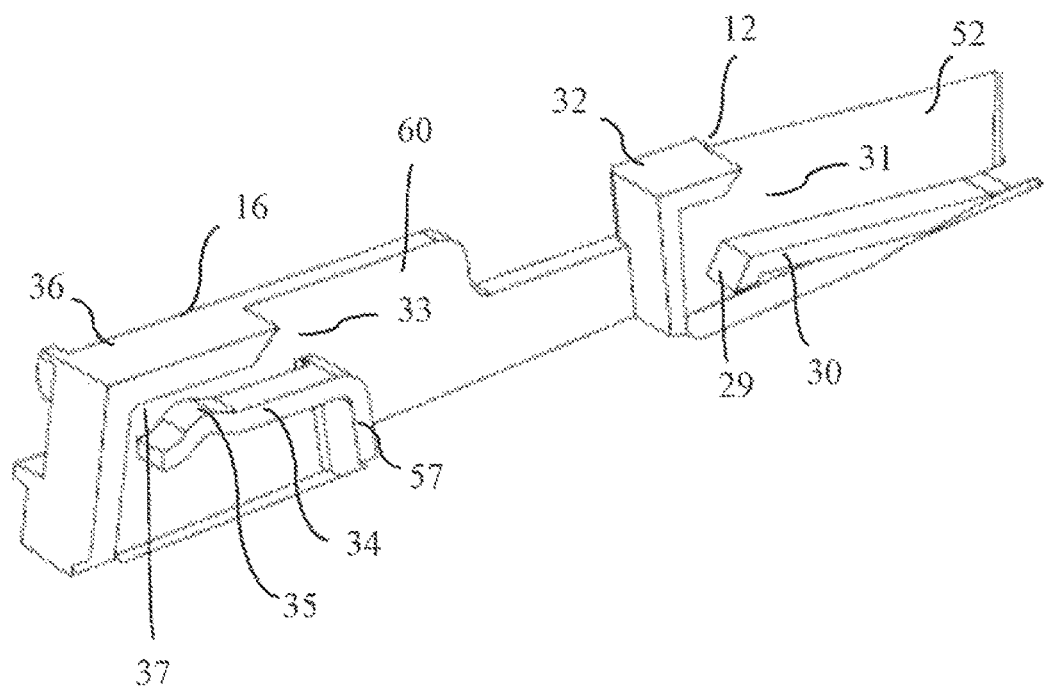
Figure 6A:
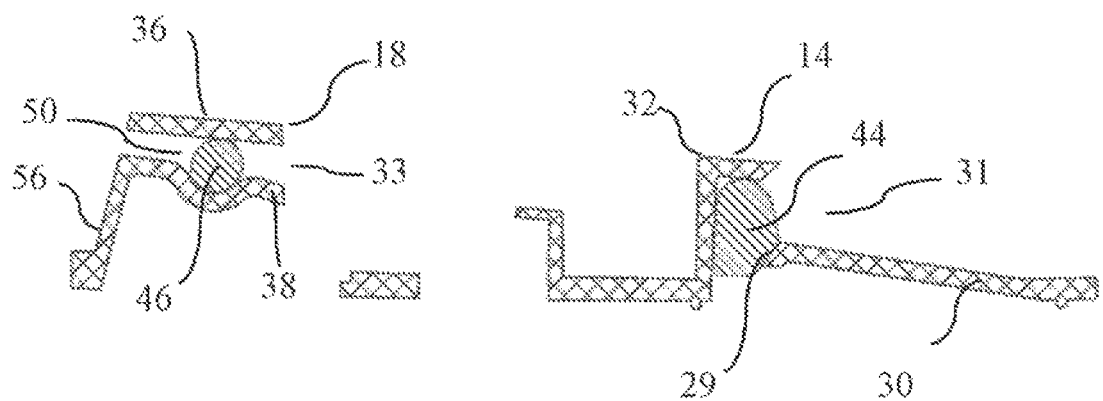
Figure 6B:
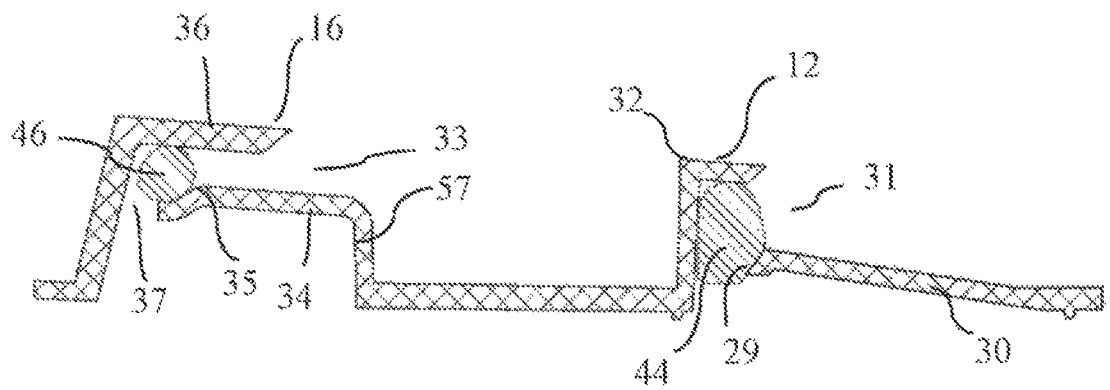
Figure 7:
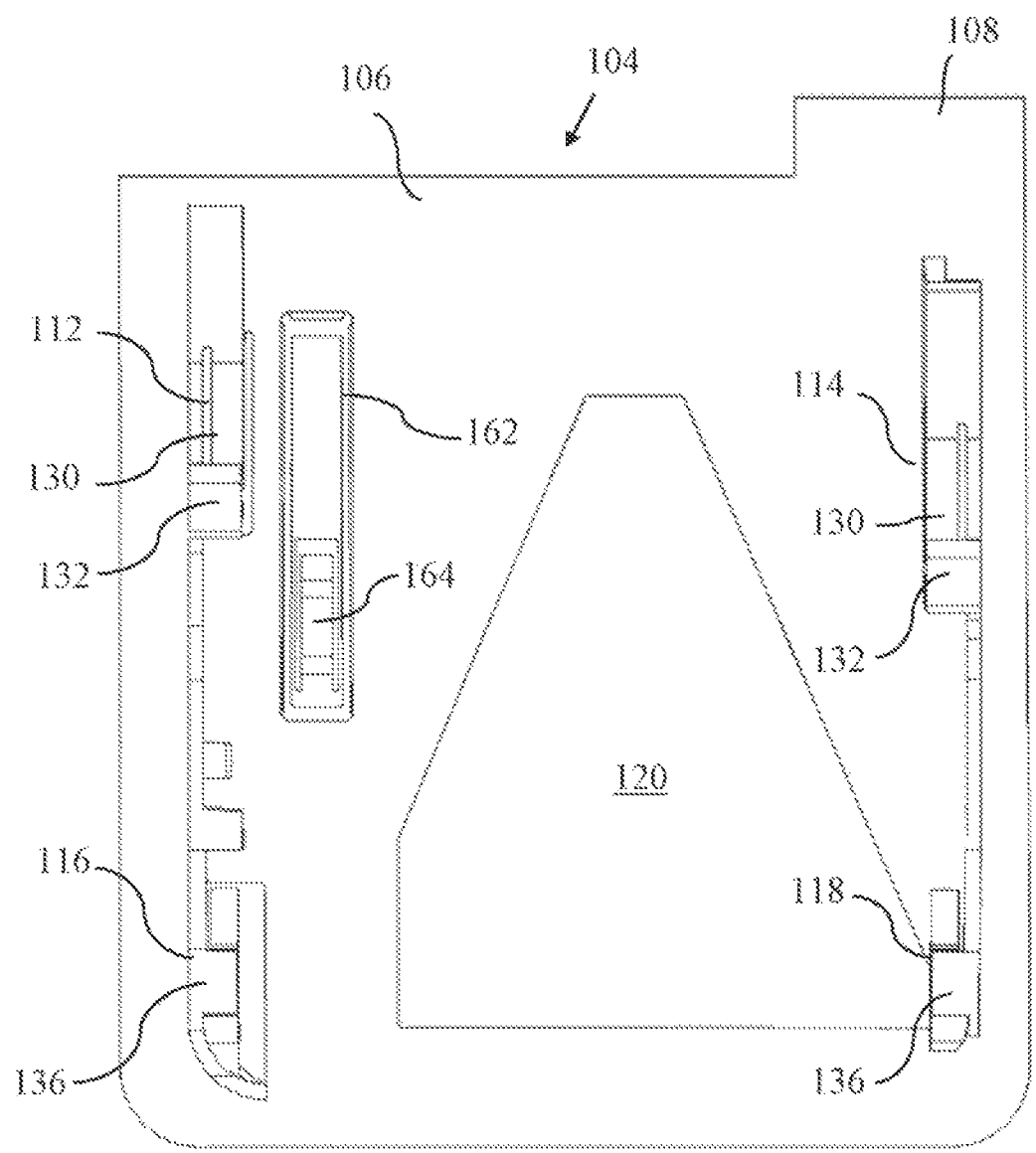
Figure 8A:
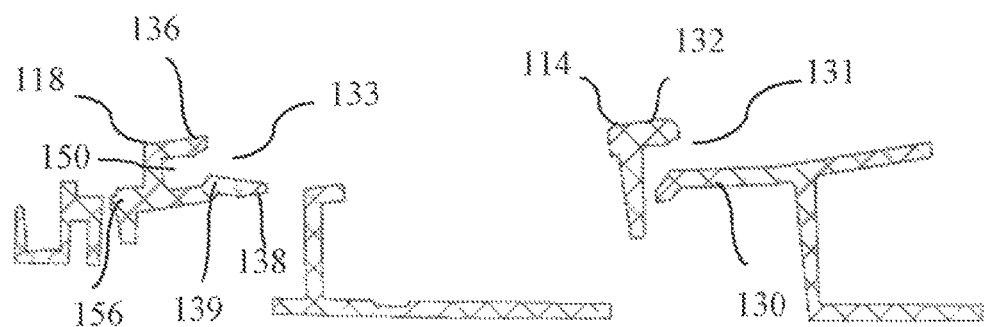
Figure 8B:
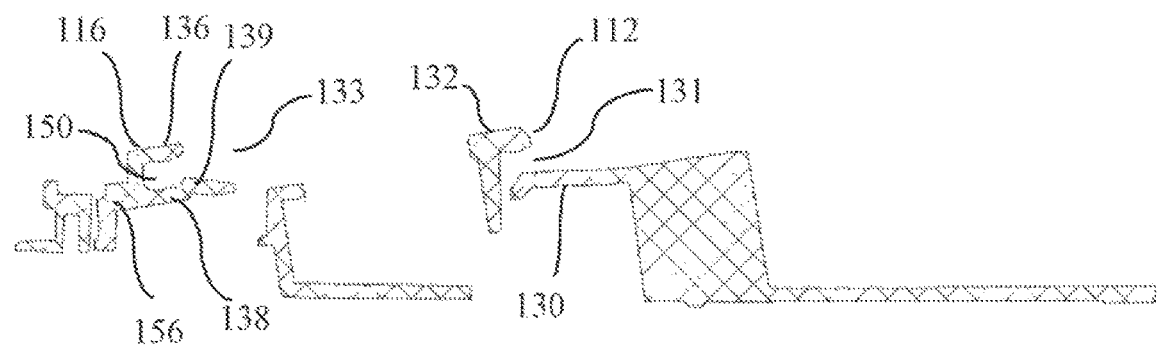
Figure 9:
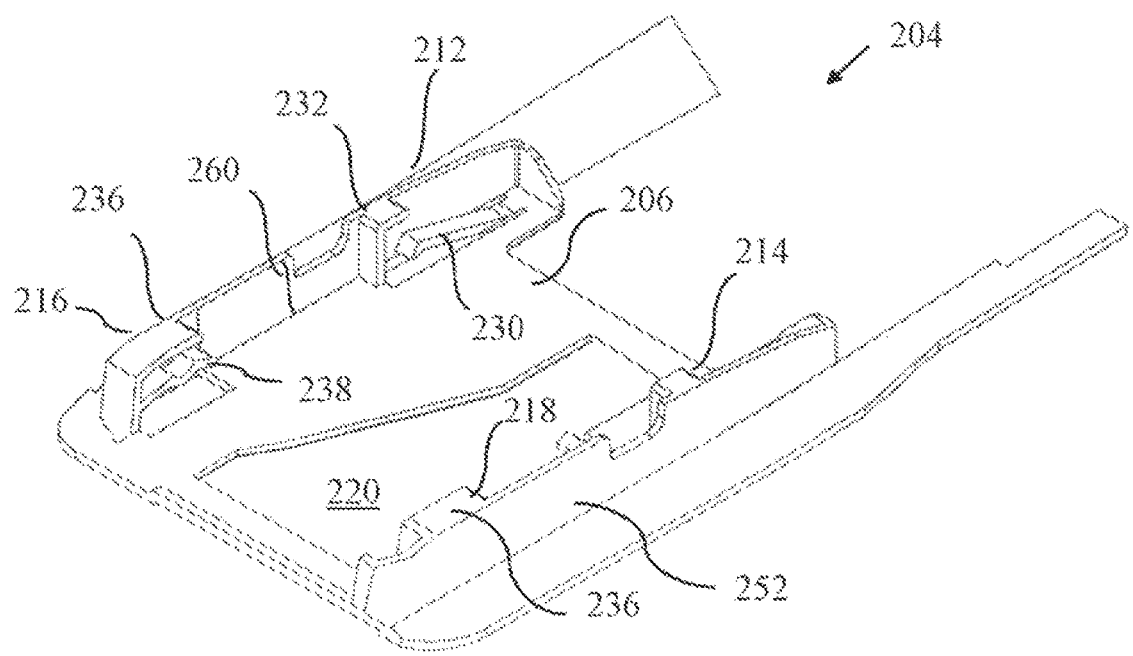
Figure 10:
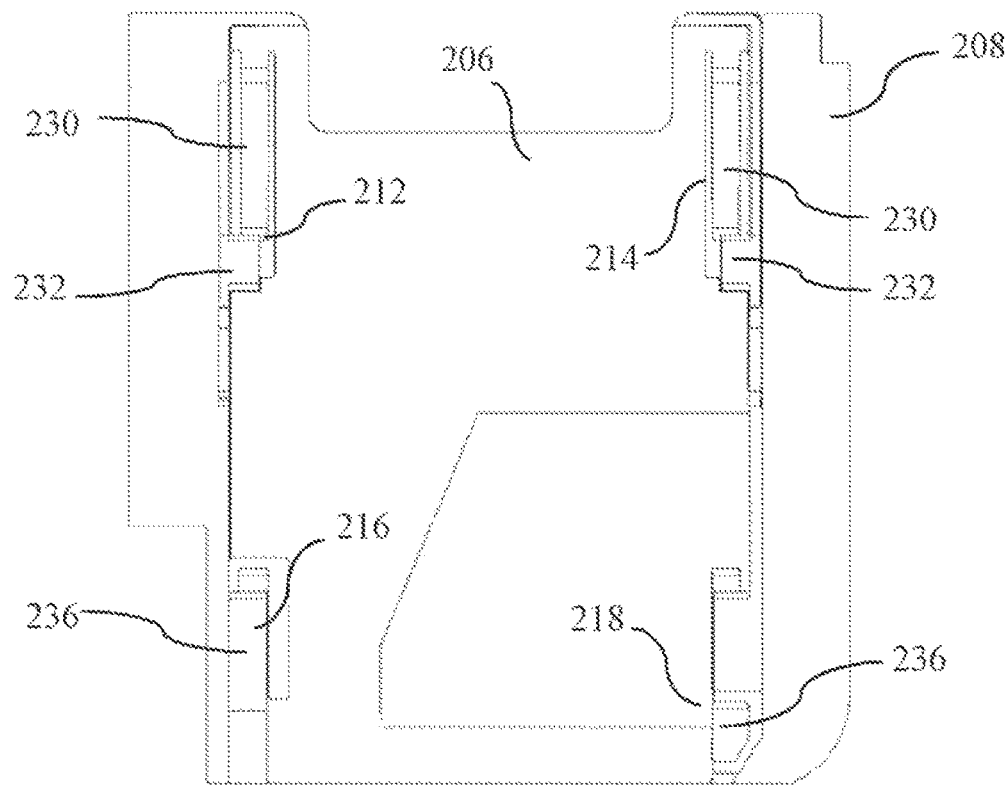
Figure 11A:
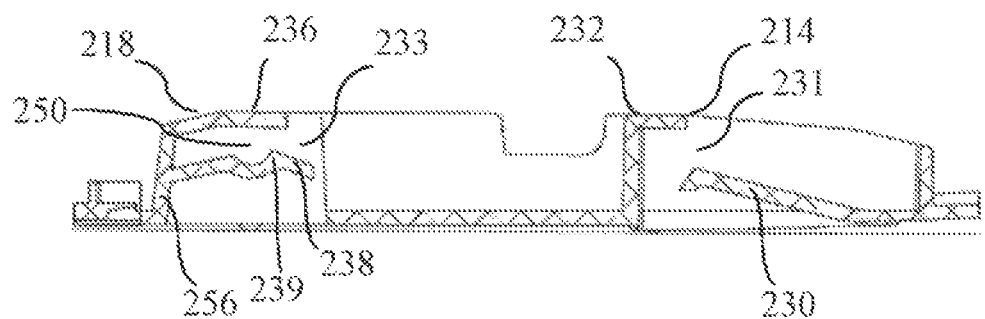
Figure 11B:
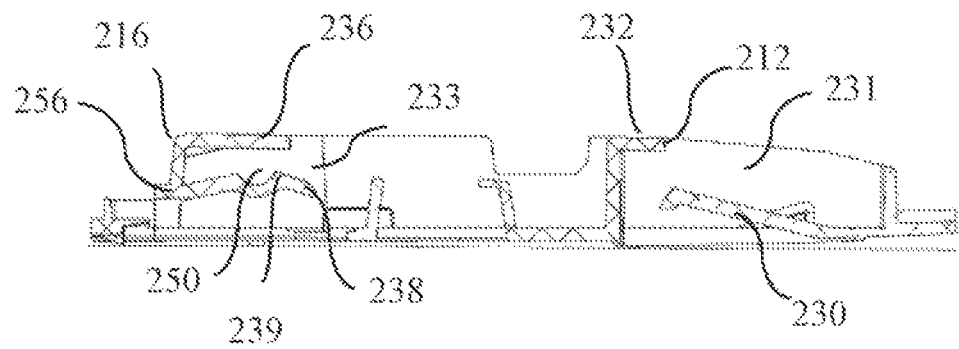

FIG. 4(a) shows a cross-section on B-B of FIG. 2; FIG. 4(b) shows a cross section on D-D of FIG. 2; FIG. 4(c) shows a cross-section on K-K of FIG. 2; and FIG. 4(d) shows a cross-section on C-C of FIG. 2;

FIG. 5(a) is a perspective view of a detail of the right side (as shown in FIG. 2) of the bracket of FIG. 2 showing retaining elements, and FIG. 5(b) is a perspective view of a detail of the left side (as shown in FIG. 2 of the sensor face of the bracket of FIG. 2 showing retaining elements;

FIG. 6(a) is a sectional view of the right-hand side of the bracket as shown in FIG. 5(a), indicating the position of the sensor mounting stubs/rods when the sensor is installed and retained in the bracket, and FIG. 6(b) is a sectional view of the left-hand side of the bracket as shown in FIG. 5(b), indicating the position of the sensor mounting stubs/rods when the sensor is installed and retained in the bracket;

FIG. 7 shows plan view of a second embodiment of a bracket according to the invention, viewed from the interior of the vehicle, and showing the face of the bracket to which the sensor is mounted;

FIG. 8(a) is a sectional view of the right-hand side (as shown in FIG. 7) of the bracket of FIG. 7, showing the retaining elements, and FIG. 8(b) is sectional view of the left-hand side (as shown in FIG. 7) of the bracket of FIG. 7, showing the retaining elements;

FIG. 9 is a perspective view of a third embodiment of a bracket according to the invention;

FIG. 10 shows a simplified plan view of the bracket of FIG. 9, viewed from the interior of the vehicle, and showing the face of the bracket to which the sensor is mounted;

FIG. 11(a) is a sectional view of the right-hand side (as shown in FIG. 10) of the bracket of FIG. 9, showing the retaining elements, and FIG. 11(b) is sectional view of the left-hand side (as shown in FIG. 10) of the bracket of FIG. 9, showing the retaining elements.

Figure 1:
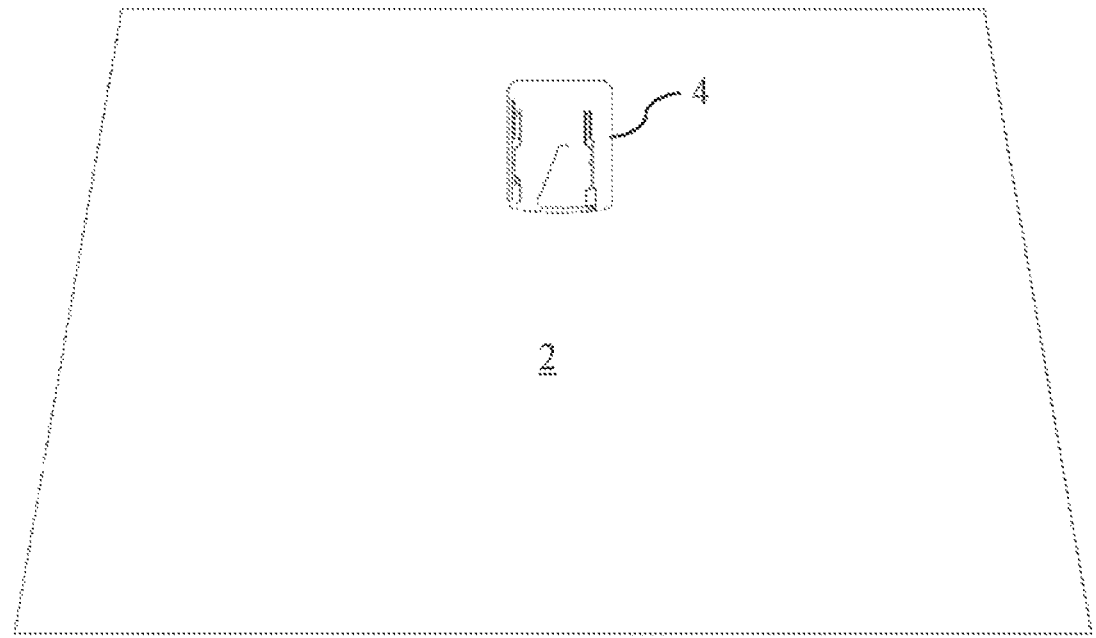
FIG. 1 is a plan view of a windscreen for a vehicle with a first embodiment of a bracket attached, the windscreen being shown as viewed from the interior of the vehicle.

FIG. 1 shows a windscreen 2 for a vehicle, to which is attached a bracket 4. The bracket 4 provides a means of mounting a camera, and other sensors such as rain or light sensors, on to the windscreen 2. This provides the sensors with a view forwards, i.e. in the direction of travel of the vehicle, while protecting the sensors from moisture, dirt and possible damage, which may result from adverse atmospheric and environmental influences such as the weather or other causes. In this position the sensors are able to monitor an area in front of the vehicle.

The windscreen 2 is generally trapezoidal, with mirror symmetry about a centreline extending from the top to the bottom of the windscreen as depicted. The bracket 4 is positioned on the centreline of the windscreen and towards its upper edge. The bracket 2 may, however, be positioned elsewhere on the windscreen 2 if necessary or desirable. The bracket 4 may be generally rectangular, trapezoidal or of an irregular shape. For aesthetic and practical reasons the bracket generally has rounded corners.

It is preferable for the bracket 4 to be positioned within the area of the windscreen 2 which is wiped by the windscreen wipers, in order to maintain the cleanliness of the part of the windscreen through which the camera views the area in front of the vehicle, so that the camera's view is not obscured by dirt.

The bracket 4 is made wholly of plastic and is bonded by a suitable adhesive to the side (i.e. one of the faces) of the windscreen which faces the interior of the vehicle. Usually, the bracket 4 is manufactured by injection moulding a thermoplastic polymer and the bracket is bonded to the windscreen by a polyurethane adhesive.

FIG. 1 depicts the windscreen 2 viewed from inside the vehicle, i.e. the drawing shows the face of the windscreen which faces the vehicle interior when the windscreen 2 is in situ in the vehicle.

FIG. 2 shows a plan view of the bracket 4, greatly enlarged in comparison with FIG. 1 in order to illustrate the details of the bracket more clearly. The direction of view in FIG. 2 is the same as in FIG. 1: i.e. from inside the vehicle. The bracket 4 comprises a baseplate 6 which has a first (sensor) surface 8 and a second (windscreen) surface 10, and a periphery consisting of upper (as orientated in the Figure) short edge 22, right long edge 28, lower short edge 24 and left long edge 26.

The first (sensor) surface 8, is the face of the bracket 4 and baseplate 6 which is directed towards the interior of the vehicle, when mounted on the windscreen 2. This is the face on which the sensor housing is to be mounted. The second (windscreen) surface 10 is the face of the bracket 4 and baseplate 6 that is mounted and adhered to the windscreen surface. The direction of view of FIGS. 1 and 2 is therefore towards the first (sensor) surface of the bracket 4 and baseplate 6.

As discussed above, when the windscreen 2 is mounted in situ in a vehicle, the first (sensor) surface 8 of the baseplate 6 of the bracket 4 faces into the interior of the vehicle, and second (windscreen) surface 10 faces the windscreen. It is therefore the second (windscreen) surface 10 which is bonded to the windscreen. Short edge 22 forms the upper edge of the bracket 4, and short edge 24 forms the lower edge of the bracket. Long edge 26 form the left-hand edge of the bracket 4, when viewed in the direction of forwards travel of the vehicle, and long edge 28 forms the right-hand edge of the bracket 4.

Positioned on the baseplate 6 are four elongate retaining elements 12, 14, 16, 18 for retaining a camera/sensor. The first 12 and second 14 upper retaining elements are similar, but mirror images of each other. The first 16 and second 18 lower retaining elements have some similarities but also differ significantly in detail.

It may be seen in FIG. 2 that there are two retaining elements 12, 16 on the left-hand side, and two elements 14, 18 on the right-hand side. The retaining elements are aligned with each other in that they are oriented with their directions of elongation (as indicated by the lines of section B-B, etc) parallel. Furthermore, the retaining elements on a particular side are also aligned with each other in the direction of elongation of the retaining elements, more specifically, they are in line with each other.

The baseplate 6 is perforated by an aperture 20: a generally trapezoidal aperture through which the camera views the area in front of the vehicle, and which is partially covered by a baffle to avoid stray light entering the camera lens.

Larger and more complex brackets are possible. For example, there may be two trapezoidal apertures arranged in tandem to accommodate the twin lenses of a stereo camera. In some embodiments, there may be other apertures intended for other sensors such as rain and light sensors.

The direction of insertion of a housing for a sensor or camera into the bracket 4 is generally in a downward direction (as seen on the drawing) and generally parallel to the baseplate 6. Owing to the rake angle of the windscreen when installed in a vehicle, the camera is inserted into the bracket 4 in a downwards and forwards direction when the windscreen is in situ in a vehicle.

Once the camera and any other components have been fitted, the bracket 4 is covered by a cover (not shown) during ordinary day to day use, both for reasons of aesthetics and to protect the components mounted on the bracket.

The second (windscreen) surface 10 of the bracket 4 has surfaces for adhesive, to which adhesive may be applied to fix the bracket 4 to the windscreen 2.

Bracket 4 is asymmetric. This is for at least two reasons, first, the retaining elements 12, 14, 16, 18 are not arranged in symmetric form on the baseplate 6, and second, lower left retaining element 16 is not a mirror image of lower right retaining element 18. More generally, none of the retaining elements need be mirror images of each other, but all could be, depending on the sensor or camera to be accommodated in the bracket.

Figure 3:
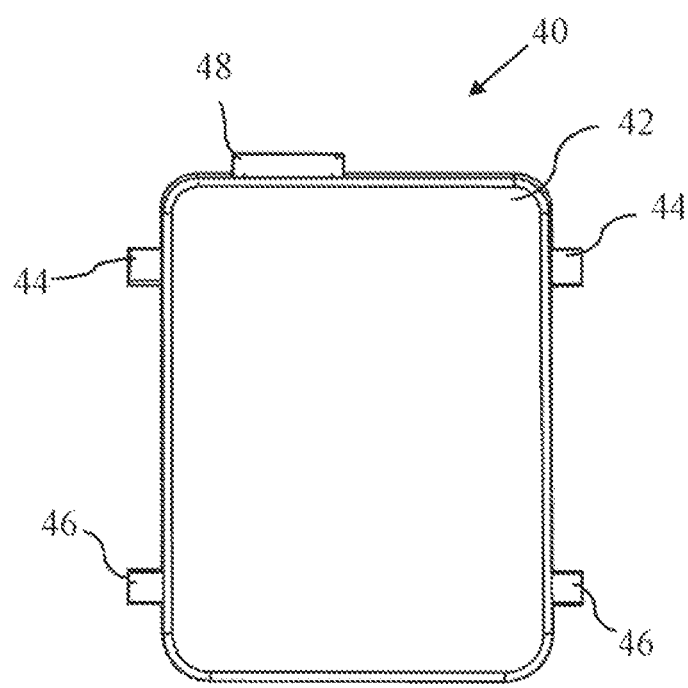
FIG. 3 is a plan view of a sensor housing, the sensor being a camera that may be mounted and retained in the bracket of FIG. 2.

FIG. 3 shows a camera or sensor assembly 40 with a sensor housing 42. The sensor housing 42 is viewed in the same direction as FIGS. 1 and 2, i.e. from inside the vehicle. The camera lens is positioned on the side of the sensor housing 42 which faces the windscreen 2, so that the direction of view of the lens is forwards and through the windscreen. Consequently, the camera lens is not visible in FIG. 3.

The sensor housing 42 has a data connector 48 for connection to the data processing devices in the vehicle when the sensor housing is installed in the bracket. The sensor housing 42 is provided with four rod-shaped sensor mounting stubs 44, 46: a pair of first or upper sensor mounting stubs 44, one on each side of the sensor housing 42 toward the upper part (as viewed in the drawing), and a pair of second or lower sensor mounting stubs 46, one on each side of the sensor housing 42 toward the lower part. The sensor mounting stubs 44, 46 protrude from the sensor housing 42. The upper sensor mounting stubs 44 have a polygonal cross-section, which may be somewhat rounded, whereas the second or lower sensor mounting stubs 46 are generally cylindrical with flattened portions. The cross-sectional shape of the mounting stubs 44, 46 may take other forms.

The mounting stubs on a particular side of the sensor housing are in line with each other. For those sensor housings where this is the case, the corresponding retaining elements of the bracket are also in line with each other.

When the sensor housing 42 is inserted into the bracket 4 in a downward direction (referring to the orientation of FIGS. 1 and 2), the lower, second sensor mounting stubs 46 are inserted into and are retained by first lower retaining element 16 and second lower retaining element 18. The upper, first sensor mounting stubs 44 are inserted into and are retained by first upper retaining element 12 and second upper retaining element 14.

FIGS. 4(*a*) to 4(*d*) show simplified cross-sectional views of the retaining elements of the bracket 4, in the positions indicated in the plan view of FIG. 2.

FIG. 4(*a*) is a section on B-B of FIG. 2 and shows the first upper retaining element 12 having a fixed support portion 32 and a resilient limb 30. The approximate position of the guideway 31 is indicated, but may be better seen in FIGS. 5(*a*) and 5(*b*) and 6(*a*) and 6(*b*). The resilient limb 30 is fixed at one end proximal the upper retainer guideway 31 entrance and free at the other end distal the guideway 31 entrance. Limb end portion 29 is angled to fit a flattened portion of mounting stub 46, when inserted. The retaining element is open at the end in the vicinity of the guideway 31, and receives one of the upper mounting stubs 44 via the guideway and through the open end of the retaining element when the sensor housing 42 is inserted in the bracket 4.

FIG. 4(*c*) is a section on K-K of FIG. 2 and shows the second upper retaining element 14 having a fixed support portion 32 and a resilient limb 30 fixed at one end proximal the upper retainer guideway 31 entrance and free at the other end distal the guideway 31 entrance. Limb end portion 29 is angled to fit a flattened portion of mounting stub 46, when inserted. The first 12 and second upper retaining elements 14 are substantially mirror images of each other, and the description of first upper retaining element above applies to second upper retaining element 14 mutatis mutandis.

FIG. 4(*b*) is a section on D-D of FIG. 2 and shows the first lower retaining element 16 having a resilient limb 34 and fixed support portion 36. In this case, the resilient limb 34 has a fixed part (its fixed end) at proximal resilient limb support 57 proximal to the lower retainer guideway 33 entrance fixed to and extending substantially perpendicularly from the baseplate 6, that then extends in a curve to form the resilient limb 34 substantially horizontal to the baseplate 6. The resilient limb 34 extends upward slightly to form a resilient tab 35 narrowing the guideway 33, and then extends in a partial concave curve downwards to define, in cooperation with the fixed support portion 36, at the free end of the resilient limb 34, a retaining recess 37 distal to the guideway entrance. Again, the retaining element is open at the end in the vicinity of the guideway 33.

FIG. 4(*d*) is a section on C-C of FIG. 2 and shows the second lower retaining element 18 having a resilient limb 34 and fixed support portion 36. In this case, the resilient limb 34 has a fixed part, distal resilient limb support 56 distal to the lower retainer guideway 33 entrance fixed to and extending substantially perpendicularly from the baseplate 6, that then extends in a curve to form resilient limb 34 substantially horizontal to the baseplate 6. The resilient limb 34 extends downward to form a concave retaining recess 50 narrowing the guideway 33, and then extends to its free end proximal the lower retainer guideway 33 entrance. The retaining element has an open end as before. It can be seen that second lower retaining element 18 is not a mirror image of first lower retaining element 16.

FIG. 5(*a*) is a perspective view of a detail of the right side (as shown in FIG. 2) of the bracket 4 showing the arrangement on the bracket 4 of the second upper retaining element 14 and second lower retaining element 18. Similarly, FIG. 5(*b*) is a perspective view of a detail of the left side (as shown in FIG. 2) of the sensor face of the bracket of FIG. 2 showing the arrangement on the bracket 4 of the first upper retaining element 12 and first lower retaining element 16. In both FIG. 5(*a*) and FIG. 5(*b*) the features of the respective retaining elements 14, 18 and 12, 16 are as discussed above.

The resilient limb 38 of the second (lower) right-hand retaining element 18 includes a concave retaining recess 50 to retain the mounting stub 46. Together with the fixed support portion 36, recess 50 provides secure retention for the mounting stub 46. In the case of the other three retaining elements 12, 14, 16, it is the free end 29 of each resilient limb 30, 34 which co-operates with the respective fixed support portion 32, 36 to provide a retaining recess 37 retain the mounting stub 44, 46.

The concave retaining recess 50 may be cylindrical or polygonal in section to correspond to the shape of the mounting stub 46.

As shown in FIG. 5, the bracket 4 also comprises guide walls 52 and side walls 60 to reinforce the bracket 4 and to help to direct the sensor mounting stubs 44, 46 into the retaining elements. The walls 52, 60 may be highest in the vicinity of the entrances to the guideways 31, 33, where the lateral positioning of the stubs 44, 46 is first established during insertion. Once the sensor is in place, the walls constrain the stubs laterally, and thereby contribute to the lateral stability of the sensor/camera. Distal resilient limb support 56 is at the fixed end of resilient limb 38, and also reinforces the bracket 4 and provide structure to the lower retaining elements 16, 18.

It may be noted that in FIG. 5(*a*) the resilient limbs are arranged in an opposed relationship, in the sense that the free ends of the limbs point towards each other. However, in FIG. 5(*b*), the free ends of the resilient limbs both point in the same direction, i.e. they are both at the left-hand ends of the resilient limbs, as seen in FIG. 5(*b*). As a consequence, when the sensor housing 42 is inserted in the bracket 4, the mounting stubs 44, 46 may either pass along the resilient limbs from their fixed ends towards their free ends, as is the case for resilient limbs 30, 34, or a mounting stub 46 may pass along a resilient limb from its free end towards its fixed end, as is the case for resilient limb 38 of retaining element 18. This is another aspect in which the design of retaining element 18 differs from the other retaining element, and illustrates the flexibility and adaptability of the design of the retaining elements.

FIGS. 6(*a*) and 6(*b*) are sectional views of the right hand side and left hand side of the bracket 4, indicating the position of the sensor mounting stubs 44, 46 when the sensor is installed and retained in the bracket 4.

Referring to FIGS. 5(*a*), 5(*b*), 6(*a*) and 6(*b*), mounting the sensor in the bracket 4 involves the mounting stubs 44, 46 being inserted into the retaining element 12, 14, 16, 18 in substantially one operation.

As regards the upper retaining elements 12, 14 (FIGS. 6(*a*) and 6(*b*)), the mounting stubs 44 of the sensor housing 42 are inserted downwardly along the upper retainer guideways 31 following the length of the resilient limbs 30 to their free ends and arriving at the fixed support portions 32. In this position, the mounting stubs 44 are urged into contact with the fixed support portions 32 by the resiliency of the resilient limb 30. The latter biases the mounting stubs against the support portion 32 and limb end portions 29, thereby retaining the mounting stubs in their final position in the right-angled recess of the support portion.

As regards the lower retaining element 16 (FIG. 6(*b*)), the mounting stub 46 of the sensor housing 42 is similarly inserted downwardly, along the lower retainer guideway 33 towards the fixed support portion 36 where it snaps over the retaining tab 35 to be retained in the retaining recess 37. In this position the mounting stub 46 is urged into contact with the fixed support portion 36 by the resiliency of the resilient limb 34 which biases the mounting stub 46 against the fixed support portion 36.

As regards the lower retaining element 18 (FIG. 6(*a*)), the mounting stub 46 of the sensor housing 42 is inserted downwardly, along the lower retainer guideway 33 towards the fixed support portion 36 where it snaps into the concave retaining recess 50 to be retained therein. In this position the mounting stub 46 is urged into contact with the fixed support portion 36 by the resiliency of the resilient limb 38 which biases the mounting stub against the concave retaining recess 50.

Other components of the bracket 4 may of course be present but have not been discussed in detail. In particular, reinforcing ribs at various locations may be advantageous in view of the stresses of use of the bracket 4.

If the dimensions of the guideways 31, 33 and mounting stubs 44, 46 are suitable and appropriate, and if the resilience (i.e. the restoring force caused by elastic deformation) of the resilient limbs 30, 38 is also appropriate, then the retaining forces exerted on the stubs 44, 46 are sufficient for the sensor/camera to be retained securely.

For especially secure retention of the stubs 44, 46, and thereby the sensor housing 42, e.g. in heavy duty applications, it is desirable that the retaining force exerted on the mounting stubs 44, 46 is great enough to amount to a clamping force. The clamping force results from the force caused by the resilience of the resilient limbs. To ensure that the resilient limbs 30, 38 exert a clamping force on the stubs 44,46, it is desirable that the width of the stubs 44, 46 should be slightly greater than the corresponding dimension in the retaining elements, with the result that the resilient limbs are unable to attain a relaxed state, i.e. they cannot return to their rest position following deflection by the mounting stub as it passes along the resilient limb.

FIGS. 7 and 8(*a*)-8(*b*) illustrate a second embodiment of a sensor or camera bracket according to the invention. Referring to these Figures, bracket 104 comprises a baseplate 106 having a first (sensor) surface 108. The second (windscreen) surface, has surfaces intended for adhesive, which is used to adhere the bracket to the windscreen. Positioned on the baseplate 106 are four retaining elements 112, 114, 116, 118 for retaining a camera/sensor, comprising a first upper retaining element 112, a second upper retaining element 114, a first lower retaining element 116 and a second lower retaining element 118.

The sensor housing (not shown) while generally similar to that illustrated in FIG. 3 in that it has four mounting stubs projecting from the sides of the housing, differs in being larger and in that the upper first sensor mounting stubs are asymmetric, the right mounting stub being displaced so that it is lower on the housing than the left. To accommodate the position of the mounting stubs of the sensor housing, the first upper retaining element 112 and second upper retaining element 114 are similarly asymmetric, with the second upper retaining element 114 being lower than the first upper retaining element 112.

Again, the bracket 104 is asymmetric, but the retaining elements 112, 114, 116, 118 are parallel to each other, and elements 112 and 116 are in line with each other, as are elements 114 and 118.

The first upper retaining element 112 has a fixed support portion 132 and a resilient limb 130 fixed at one end proximal the upper retainer guideway 131 entrance and free at the other end distal the guideway 131 entrance. Similarly, the second upper retaining element 114 has a fixed support portion 132 and a resilient limb 130 fixed at one end proximal the upper retainer guideway 131 entrance and free at the other end distal the guideway 131 entrance. The free ends of the resilient limbs 130 are angled downward and the resilient limbs 130 cooperate with the fixed support portion 132 to retain the mounting stubs in use.

The first and second lower retaining elements 116, 118 each have a resilient limb 138 and fixed support portion 136. The resilient limb 138 has a fixed part distal to the lower retainer guideway 133 entrance, fixed to part of the fixed support portion 136 and extending generally horizontally to the baseplate 106. The resilient limb 138 extends upward slightly to form a retaining lip 139, narrowing the guideway 133, and then extends at a shallow angle downwards to a flared guideway 133 entrance. The fixed support portion 136 has a part extending perpendicularly away from the baseplate 106 and then through an angle to extend horizontally. Thus, the resilient limb 138 and fixed support portion 136 together form a substantially three-sided (in cross-section) retaining recess 150 (FIGS. 8(a) and 8(b)).

As in the first embodiment discussed above, mounting the sensor in the bracket 104 involves the mounting stubs of the sensor housing (not shown) being inserted into the retaining element 112, 114, 116, 118 in substantially one operation. For the upper retaining elements 112, 114, the upper mounting stubs are inserted downwardly along the upper retainer guideways 131 following the length of the resilient limbs 130 to their free ends and arriving at the fixed support portions 132. In this position the mounting stubs are urged into contact with the fixed support portions 132 by the resiliency of the resilient limbs 130. The mounting stubs are retained in position between the free end of the resilient limb 130 and the support portion 132 by the biasing action of the resilient limbs 130.

For the lower retaining elements 116, 118 the mounting stubs are inserted downwardly, along the lower retainer guideways 133 towards the fixed support portions 136 where they snap over the retaining lips 139. In this position the mounting stubs are biased against the fixed support portions 136 by the resiliency of the resilient limbs 138 to be retained in the retaining recess 150.

On the baseplate 106 there is an additional elongate biasing structure 162 with a biasing limb 164 having a fixed end fixed to the biasing structure 162 towards the lower part of the bracket 106 and a free end towards the upper part. When the sensor housing is mounted, the biasing limb 164 presses the mounting stubs against the retaining elements, holding the sensor even more firmly in place.

The baseplate 106 is perforated by an aperture 120 through which the camera obtains a forward view. The aperture is partially closed by a baffle (not shown). In use, the bracket 104 is covered by a cover (not shown) both for reasons of aesthetics and to protect the components mounted on the bracket.

FIGS. 9, 10 and 11(a)-11(b) illustrate a third embodiment of a sensor or camera bracket according to the invention. Referring to these Figures, bracket 204 comprises a baseplate 206 having a first (sensor) surface 208. The second (windscreen) surface has surfaces intended for adhesive. Positioned on the baseplate 206 are four retaining elements 212, 214, 216, 218 for retaining a camera/sensor. The sensor housing is generally as illustrated in FIG. 3.

The first 212 and second 214 upper retaining elements have fixed support portion 232, fixed to the baseplate 206, and resilient limbs 230 fixed at one end proximal the upper retainer guideway 231 entrance and free at the other end distal the guideway 231 entrance. The free ends of the resilient limbs 230 are angled downward and the resilient limbs 230 cooperate with the fixed support portions 232 to hold and retain the mounting stubs.

The first 216 and second lower retaining element 218 each have a resilient limb 238 and fixed support portion 236. The resilient limb 238 has a fixed part distal to the lower retainer guideway 233 entrance, fixed to part of the fixed support portion 236 and extending generally horizontally to the baseplate 206. The resilient limb 238 extends to form a retaining recess 250, and a retaining lip 239 narrowing the guideway 233, and then extends at a shallow angle downwards to a flared guideway 233 entrance. The fixed support portion 236 has a part extending perpendicularly away from the baseplate 206 and joins with the resilient limb 238 and then through an angle to extend horizontally.

The bracket 204 comprises guide walls 252 and side walls 260 to reinforce the bracket 204 and to help to direct the sensor mounting stubs into the retaining elements.

As in the first and second embodiments discussed above, mounting the sensor in the bracket 204 involves the mounting stubs of the sensor housing being inserted into the retaining elements 212, 214, 216, 218 in substantially one operation. For the upper retaining elements 212, 214, the upper mounting stubs are inserted downwardly along the upper retainer guideways 231 following the length of the resilient limbs 230 to their free ends and the fixed support portions 232 where the mounting stubs are biased by the resiliency of the resilient limbs 230 and between the free ends of the resilient limbs 230 and against the support portions 232.

For the lower retaining elements 216, 218 the mounting stubs are inserted downwardly, along the lower retainer guideways 233 towards the fixed support portions 236 where they snap over the retaining lips 239 and are biased against the fixed support portions 236 by the resiliency of the resilient limbs 238, so that the mounting stubs are retained in the retaining recesses 250.

The baseplate 206 is perforated by an aperture 220 through which the camera obtains a forward view. The aperture is partially closed by a baffle (not shown). In use, the bracket 204 is covered by a cover (not shown) both for reasons of aesthetics and to protect the components mounted on the bracket.

The three embodiments of sensor/camera bracket described above are capable of holding a sensor or camera securely, accurately and reproducibly without recourse to additional components such as secondary brackets, cradles, carriers or metal springs. Furthermore, the provision of two mounting stubs per side of the sensor housing, and two corresponding retaining elements per side of the bracket, facilitate insertion of the sensor housing into the bracket, and ensure accurate, secure and reproducible retention of the sensor housing in the bracket after installation.

REFERENCE NUMERALS 2 windscreen
4 bracket
6 baseplate
8 first (sensor) surface
10 second (windscreen) surface
12 first upper retaining element
14 second upper retaining element
16 first lower retaining element
18 second lower retaining element
20 baffle aperture
22 short edge
24 short edge
26 long edge
28 long edge
29 limb end portion
30 resilient limb
31 upper retainer guideway
32 fixed support portion
33 lower retainer guideway
34 resilient limb
35 raised retaining tab
36 fixed support portion
37 retaining recess
38 resilient limb
40 sensor assembly
42 sensor housing
44 first sensor mounting stub
46 second sensor mounting stub
48 data connector
50 concave retaining recess
52 guide wall
56 distal resilient limb support
57 proximal resilient limb support
60 side wall
104 bracket
106 baseplate
108 first (sensor) surface
112 first upper retaining element
114 second upper retaining element
116 first lower retaining element
118 second lower retaining element
120 baffle aperture
130 resilient limb
131 upper retainer guideway
132 fixed support portion
133 lower retainer guideway
136 fixed support portion
138 resilient limb
139 retaining lip
150 retaining recess
156 distal resilient limb support
162 biasing device
164 biasing limb
204 bracket
206 baseplate
208 first (sensor) surface
212 first upper retaining element
214 second upper retaining element
216 first lower retaining element
218 second lower retaining element
220 baffle aperture
230 resilient limb
231 upper retainer guideway
232 fixed support portion
233 lower retainer guideway
236 fixed support portion
238 resilient limb
239 retaining lip
250 concave retaining recess
252 guide wall
256 distal resilient limb support
260 side wall

The invention claimed is:

1. A windscreen for a vehicle, the windscreen comprising,
a bracket for a sensor including a camera, the bracket being attached to the windscreen and comprising a baseplate and at least three retaining elements mounted on the baseplate,
the sensor being accommodated within a sensor housing which may be inserted in the bracket,
the sensor housing comprising at least three mounting stubs projecting from the sensor housing by means of which the sensor housing may be retained in the bracket in a removable manner by retaining each of the mounting stubs in a corresponding retaining element, wherein
each retaining element is elongate, and comprises a fixed support portion at one end and is open at an other end to receive one of the mounting stubs,
each retaining element comprises a resilient limb which extends in a direction of elongation of the retaining element, the resilient limb being fixed at one end and free at an other end,
a guideway is provided in a vicinity of the open end of each retaining element, the guideway being partially defined by the resilient limb and its respective fixed support portion, and the guideway guides the respective mounting stub into the corresponding retaining element when the sensor housing is inserted into the bracket,
each resilient limb and fixed support portion together define a retaining portion,
the bracket and the sensor housing are configured such that a direction of insertion of the sensor housing into the bracket is generally in a downward direction and generally parallel to the baseplate,
whereby when the mounting stub has been inserted downwardly in the bracket and has passed along the guideway, the mounting stub is stopped and retained in the retaining portion by biasing action of the resilient limb.

2. A windscreen as claimed in claim 1, wherein an entrance to at least one guideway is flared to accommodate the mounting stub.

3. A windscreen as claimed in claim 1, wherein the at least one retaining portion comprises a retaining recess to retain the mounting stub.

4. A windscreen as claimed in claim 3, wherein the at least one resilient limb is shaped to at least partially form the retaining recess.

5. A windscreen as claimed in claim 1, wherein the at least one resilient limb comprises a retaining tab projecting into the guideway to further retain the mounting stub when in the retaining portion.

6. A windscreen as claimed in claim 5, wherein the retaining tab on the resilient limb provides a snap action retaining portion for the mounting stub.

7. A windscreen as claimed in claim 1, wherein the at least one resilient limb comprises a retaining lip projecting into and angled into the guideway to further retain the mounting stub when in the retaining portion.

8. A windscreen as claimed in claim 1, wherein four mounting stubs project from the sensor housing into four corresponding retaining elements.

9. A windscreen as claimed in claim 8, wherein the four retaining elements are arranged, such that, on each of two sides of the base plate, two of the four retaining elements are provided with their directions of elongation parallel and substantially aligned with each other.

10. A windscreen as claimed in claim 1, wherein at least two of the retaining elements are arranged on the baseplate with their directions of elongation parallel and substantially aligned with each other.

11. A windscreen as claimed in claim 1, wherein the at least one resilient limb has a free end and a fixed end, and the fixed end is supported by a support portion fixed to the bracket and proximal to the entrance to its respective guideway.

12. A windscreen as claimed in claim 1, wherein the at least one resilient limb has a free end and a fixed end, and the fixed end is supported by a support portion fixed to the bracket and distal to the entrance to its respective guideway.

13. A windscreen as claimed in claim 1, wherein a width of the mounting stub is greater than a corresponding dimension of its respective retaining portion.

14. A windscreen as claimed in claim 1, wherein the bracket is made wholly of plastic.

15. A windscreen as claimed in claim 1, wherein the bracket is sufficient to retain the sensor without a second bracket or separate parts attached to the bracket.

16. A bracket for attachment to a vehicle windscreen, wherein the bracket is adapted to receive a sensor including a camera, and the bracket is in accordance with a bracket as set forth in claim 1.

\* \* \* \* \*